US012559028B2

(12) United States Patent
Ishiyama et al.

(10) Patent No.: US 12,559,028 B2
(45) Date of Patent: Feb. 24, 2026

(54) NOTIFICATION DEVICE, NOTIFICATION METHOD, AND NON-TRANSITORY STORAGE MEDIUM STORING A NOTIFICATION PROGRAM

(71) Applicant: TOYOTA JIDOSHA KABUSHIKI KAISHA, Toyota (JP)

(72) Inventors: Yuichi Ishiyama, Toyota (JP); Yoshitaka Kijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 18/522,684

(22) Filed: Nov. 29, 2023

(65) Prior Publication Data

US 2024/0208409 A1      Jun. 27, 2024

(30) Foreign Application Priority Data

Dec. 27, 2022      (JP) ................................. 2022-209415

(51) Int. Cl.
 B60Q 9/00              (2006.01)
(52) U.S. Cl.
 CPC ...................................... B60Q 9/00 (2013.01)
(58) Field of Classification Search
 CPC ........ B60Q 9/00; G06V 10/56; G06V 20/582; G08G 1/0962; G08G 1/09623; G08G 1/16; G08G 1/166; G08G 1/0104; G08G 1/0175; G07B 15/06
 See application file for complete search history.

(56) References Cited

U.S. PATENT DOCUMENTS

| | | | | |
|---|---|---|---|---|
| 9,035,797 | B2 * | 5/2015 | Varma ................... | G08G 1/0104 |
| | | | | 340/905 |
| 9,672,734 | B1 * | 6/2017 | Ratnasingam ... | G08G 1/096741 |
| 9,835,468 | B2 | 12/2017 | Yoshitomi et al. | |
| 10,017,178 | B2 | 7/2018 | Morimoto et al. | |
| 10,132,642 | B2 | 11/2018 | Yoshitomi et al. | |
| 10,679,077 | B2 | 6/2020 | Kinoshita et al. | |
| 11,010,624 | B2 | 5/2021 | Hayashi et al. | |
| 11,017,247 | B2 | 5/2021 | Hayashi et al. | |
| 11,117,595 | B2 | 9/2021 | Sasaki et al. | |
| 11,200,801 | B1 * | 12/2021 | Wilkin ................... | G08G 1/096 |

(Continued)

FOREIGN PATENT DOCUMENTS

| | | |
|---|---|---|
| JP | 2014-215697 A | 11/2014 |
| JP | 2021-047565 A | 3/2021 |

*Primary Examiner* — Ig T An
(74) *Attorney, Agent, or Firm* — Dinsmore & Shohl LLP

(57)      ABSTRACT

The notification device is equipped with an on-vehicle sensor that obtains information about objects existing around the own vehicle; an information presentation device that presents information to the driver of the own vehicle; and a processor capable of executing an attention-drawing process to draw the driver's attention to a traffic signal positioned in front of the own vehicle, by presenting predetermined information to the information presentation device when the processor detects, based on the information obtained from the on-vehicle sensor, that the red signal of the traffic signal is lit. The processor is configured not to execute the attention-drawing process when the condition is met for recognizing that the red signal of a traffic signal of an adjacent gate to the gate predicted to be passed by the own vehicle is lit.

5 Claims, 6 Drawing Sheets

(56)        References Cited

U.S. PATENT DOCUMENTS

| | | | |
|---|---|---|---|
| 11,645,852 B2 * | 5/2023 | Krivokon | G06V 20/584 |
| | | | 701/301 |
| 2021/0247526 A1 | 8/2021 | Kijima | |

* cited by examiner

NOTIFICATION DEVICE, NOTIFICATION METHOD, AND NON-TRANSITORY STORAGE MEDIUM STORING A NOTIFICATION PROGRAM

CROSS-REFERENCE TO RELATED APPLICATIONS

This application claims priority to Japanese Patent Application No. 2022-209415 filed on Dec. 27, 2022, the content of which is hereby incorporated by reference in its entirety into this application.

BACKGROUND

The present disclosure relates to a notification device, method, and program that presents information to alert the driver of the own vehicle when the red signal of a traffic signal ahead of the own vehicle is lit.

DESCRIPTION OF THE RELATED ART

Notification devices have been proposed that present information to alert the driver of the own vehicle when the red signal of a traffic signal ahead of the own vehicle is lit (for example, see Japanese Patent Application Laid-open No. 2021-047565). The notification device in this Patent Document (hereinafter referred to as "conventional device") includes a camera, a processor, and an information presentation device (display, buzzer, etc.). The camera supplies the processor with image data obtained by capturing the foreground of the own vehicle. The processor analyzes the acquired image data to recognize the lighting state of the traffic signal. When the processor detects the existence of a traffic signal with a red signal (hereinafter referred to as "stop signal") lit ahead of the own vehicle, it executes an attention-drawing process to present certain information by controlling the information presentation device (for example, display, buzzer, etc.). For example, the processor causes a certain alert image (for example, an icon of a red signal) to be displayed on the display device. This increases the safety of the own vehicle.

SUMMARY

Meanwhile, stop signals (red signals) are installed at each entrance gate or exit gate of expressways (toll roads) to indicate that passing through them is prohibited. When the stop signal provided at the gate is not lit, passing through the gate is permitted. On the other hand, when the stop signal provided at the gate is lit, passing through the gate is prohibited. When an own vehicle equipped with the conventional device is proceeding toward a specific first gate, the stop signals of not only the first gate but also the second gate next to the first gate may enter the field of view of the camera of the conventional device. Here, it is assumed that the stop signal of the first gate is not lit and the stop signal of the second gate is lit. Under this circumstance, the processor may detect that the stop signal of the second gate is lit and execute the attention-drawing process. Thus, even though passing through the first gate is permitted, the processor may execute the attention-drawing process, potentially confusing the driver.

One of the objectives of the present disclosure is to provide a notification device capable of suppressing alerts to the driver about stop signals unrelated to the driving of the own vehicle.

To achieve the above objective, the notification device (1) of the present disclosure comprises:

an on-vehicle sensor (20) that obtains information about objects existing around the own vehicle;

an information presentation device (30) that presents information to the driver of the own vehicle; and a processor (10) capable of executing an attention-drawing process to draw the driver's attention to a traffic signal positioned in front of the own vehicle, by presenting predetermined information to the information presentation device when the processor detects, based on the information obtained from the on-vehicle sensor, that the red signal (S, S0, S1, SSa, SSb) of the traffic signal is lit.

The processor is configured not to execute the attention-drawing process when the condition Is met for recognizing that the red signal of a traffic signal of an adjacent gate to the gate predicted to be passed by the own vehicle is lit.

According to the notification device of the present disclosure, when the own vehicle is passing through one of the adjacent gates, alerts to the driver about stop signals unrelated to the driving of the own vehicle are suppressed.

In one embodiment of the notification device of the present disclosure, the processor is configured to determine that the condition (A) has been met when it detects that there is no lit red signal within a predetermined area above the trajectory predicted to be passed by the own vehicle, and there is a lit red signal to the left and/or right of the predetermined area, and furthermore, there is a structure of a building (BD) between the lit red signal and the predetermined area.

Thus, the processor can relatively easily recognize that "the red signal of a traffic signal installed at a gate adjacent to a gate predicted to be passed by the own vehicle is lit."

In another embodiment of the notification device of the present disclosure, the processor is configured to determine that the condition (B) has been met when it detects a sign indicating an automatic toll collection gate of a toll road, and that there is no lit red signal within a predetermined area above the trajectory predicted to be passed by the own vehicle, and there is a lit red signal to the left and/or right of the predetermined area, and furthermore, there is a structure of a building between the lit red signal and the predetermined area.

According to this, the processor can relatively easily recognize that "the red signal of a traffic signal installed at a gate adjacent to a gate predicted to be passed by the own vehicle is lit."

Furthermore, the notification method and program of the present disclosure include steps executed by various devices equipped in the aforementioned notification device.

DESCRIPTION OF THE EMBODIMENTS

Overview

A notification device 1 according to an embodiment of the present disclosure is installed in a vehicle V equipped with an autonomous driving function (hereinafter referred to as "own vehicle"). The notification device 1 has an attention-drawing function that executes an attention-drawing process to alert the driver to the stop signal S when the autonomous driving function is disabled and the driver is actively executing driving operations, and the own vehicle approaches a traffic signal and detects that the red signal (stop signal S) of the traffic signal is lit.

Specific Configuration

Figure 1:
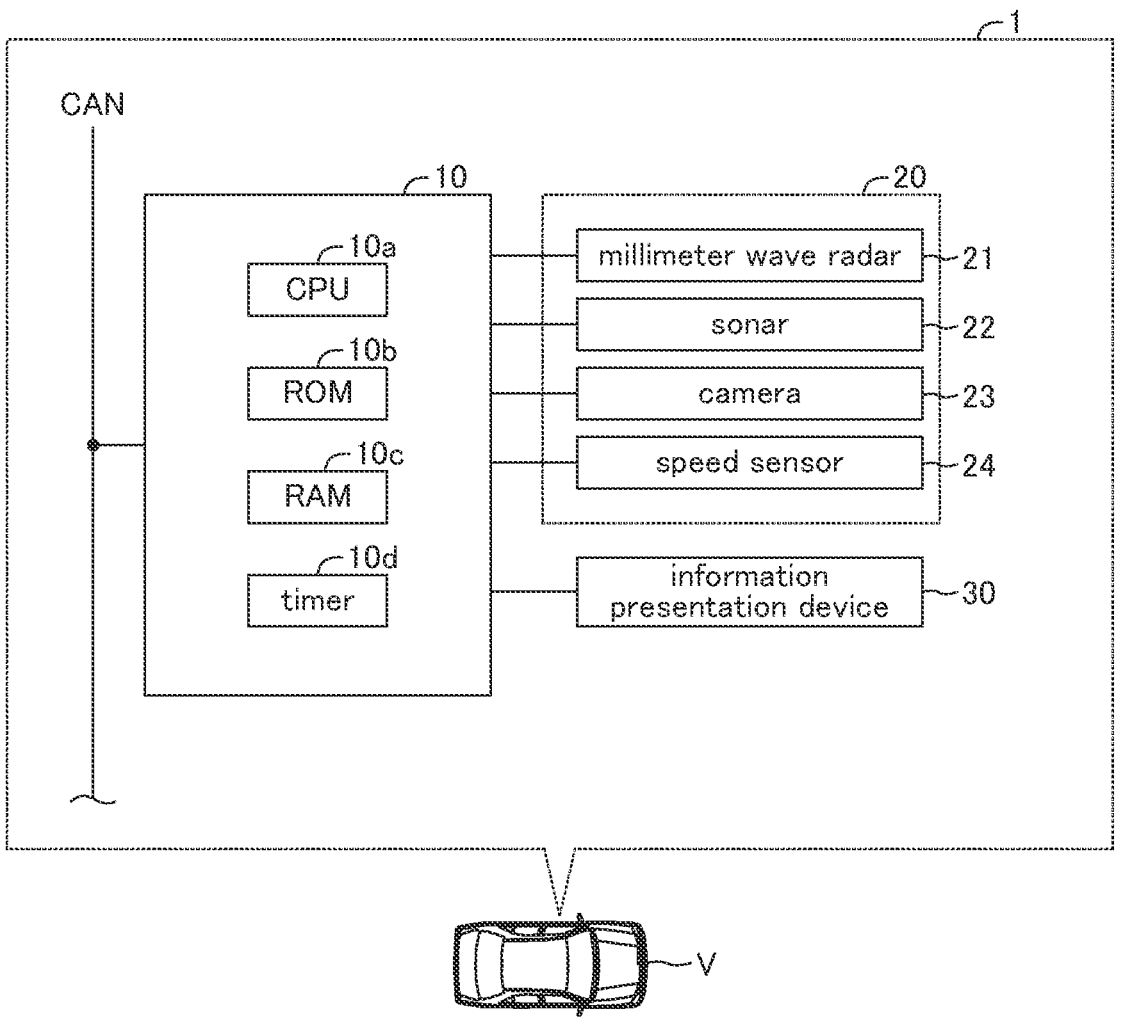
FIG. 1 is a block diagram of a notification device according to an embodiment of the present disclosure.

As shown in FIG. 1, the notification device 1 includes a notification electronic control unit (ECU) 10, an on-vehicle sensor 20, and an information presentation device 30.

The notification ECU 10 includes a CPU 10*a*, ROM 10*b*, RAM 10*c*, timer 10*d*, etc. The notification ECU 10 is connected to other ECUs via CAN.

The on-vehicle sensor 20 includes a surrounding sensor that obtains information about objects existing around the own vehicle. For example, the on-vehicle sensor 20 includes a millimeter wave radar 21, a sonar 22, and a camera 23 as the surrounding sensor.

The millimeter wave radar 21 includes a transceiver part and a signal processing part. The transceiver part emits millimeter waveband radio waves (hereinafter referred to as "millimeter waves") to the front of the own vehicle and receives the millimeter waves (reflected waves) that have been reflected by three-dimensional objects located within the radiation range. Based on the time from when the transceiver part emits the millimeter waves to when it receives the reflected waves, the phase difference between the emitted millimeter waves and the received reflected waves, the attenuation degree of the reflected waves, etc., the signal processing part recognizes the distance and the relative position (direction) of the three-dimensional object with respect to the own vehicle and sends the recognition result to the notification ECU 10.

The sonar 22 emits ultrasonic waves intermittently into the surrounding area of the own vehicle and receives ultrasonic waves (reflected waves) reflected by three-dimensional objects. Based on the time from when it emits the ultrasonic waves to when it receives the reflected waves, the sonar 22 recognizes the distance and the relative position (direction) of the three-dimensional object with respect to the own vehicle and sends the recognition result to the notification ECU 10.

The camera 23 includes an imaging device and an image analysis device. The imaging device, for example, incorporates a CCD. The imaging device is installed in the front part of the own vehicle. The imaging device acquires image data by shooting the foreground of the own vehicle at a predetermined frame rate. The imaging device sends the image data to the image analysis device. The image analysis device analyzes the acquired image data and recognizes the objects existing in front of the own vehicle.

The image analysis device, for example, recognizes (identifies) three-dimensional objects such as guardrails, poles, curbs, structures (walls, pillars) forming gates of expressways (toll roads), and other vehicles traveling near the own vehicle. The image analysis device sends information representing the type and position (coordinates in the image) of the recognized three-dimensional objects to the notification ECU 10.

The image analysis device, for example, recognizes driving lanes based on the image of the lane lines drawn on the road surface in front of the own vehicle. The image analysis device sends information representing the position (the area occupied by the lane in the image) of each recognized driving lane to the notification ECU 10.

Furthermore, the image analysis device tries to recognize the lit status (on/off) of the stop signal S located in front of the own vehicle. When the image analysis device can recognize that the stop signal S is lit, it sends information representing the position (coordinates in the image) of the stop signal S to the notification ECU 10. If the image analysis device recognizes that multiple stop signals S are on in the acquired image, it sends information representing the positions of these stop signals S to the notification ECU 10.

In addition, the on-vehicle sensor 20 includes a speed sensor 24. The speed sensor 24 includes a wheel speed sensor that generates one pulse signal (wheel pulse signal) each time the wheel of the own vehicle rotates a certain angle. The speed sensor 24 measures the number of wheel pulse signals transmitted from the wheel speed sensor per unit time, calculates the rotation speed (wheel speed) of each wheel based on the measured pulse count, and calculates the speed (actual speed) of the own vehicle based on the wheel speed of each wheel. The speed sensor 24 sends this calculation result to the notification ECU 10.

The information presentation device 30 is equipped with a display device made up of an LCD display, LEDs, and so forth. The display device displays a predetermined alert image according to the alert start command received from the notification ECU 10. Also, the display device deletes the alert image according to the alert termination command received from the notification ECU 10.

Operation

At a certain cycle, the notification ECU 10 obtains the analysis result (position) regarding the stop signal S from the camera 23 and executes the following attention-drawing process.

Attention-Drawing Process

When the notification ECU 10 obtains the information (position) of the stop signal S from the camera 23, it obtains the speed vs of the own vehicle from the speed sensor 24. It determines whether the speed vs is less than the threshold vsth.

Here, the threshold vsth is the maximum speed at which the driver can stop the own vehicle before the stop signal S by stepping on the brake pedal when they receive the alert mentioned later. The threshold vsth is set according to the distance ΔD between the stop signal S and the own vehicle. For example, the notification ECU 10 obtains the distance ΔD based on the recognition result obtained from the millimeter wave radar 21. The notification ECU 10 refers to a database that represents the relationship between the distance ΔD and the threshold vsth to obtain the threshold vsth. Alternatively, the notification ECU 10 may obtain the threshold vsth corresponding to the distance ΔD based on a certain calculation formula. The aforementioned database and calculation formula may be configured so that a relatively small value is assigned to the threshold vsth when the distance $\Delta D$ is relatively small, and a relatively large value is assigned when the distance $\Delta D$ is relatively large. In a special operation mode (for example, for elderly drivers), a value smaller than the standard value may be assigned to the threshold vsth.

If the speed vs is less than the threshold vsth, the notification ECU 10 controls the information presentation device 30 to present information to the driver indicating "the nearest signal prohibits vehicle passage" (attention-drawing process). Specifically, the notification ECU 10 sends an alert start command to the display device. When the information presentation device 30 receives the alert start command, it displays a predetermined alert image (icon of a red signal).

However, if the following condition A for the stop signal S, which the notification ECU 10 detected as being lit, is met, the notification ECU 10 does not execute the attention-drawing process to draw the driver's attention to the stop signal S.

<Condition A> There is no lit stop signal S present in the area SA above the trajectory predicted to be traversed by the own vehicle, and a lit stop signal S exists to the left and/or right of the area SA, furthermore, a structure of the building BD exists between the lit stop signal S and the area SA.

As will be described later, the notification ECU 10 determines whether Condition A is met, and based on the determination result, decides whether or not to execute the attention-drawing process.

When the notification ECU 10 obtains information (position) about the stop signal S from the camera 23, it obtains information about the driving lane from the camera 23. Then, based on the information about the driving lane, the notification ECU 10 recognizes the driving lane L0 in which the own vehicle is traveling. The notification ECU 10 predicts that the own vehicle will proceed along the driving lane L0. That is, the driving lane L0 is the trajectory predicted to be passed by the own vehicle. Note that the notification ECU 10 may recognize the driving lane L0 in which the own vehicle is traveling based on the information (recognition results of guardrails, poles, etc.) obtained from the millimeter wave radar 21 and/or sonar 22.

Here, there are cases where the driving lane L0 recognized by the notification ECU 10 is interrupted in front of the own vehicle (when the partition lines recognized by the image analysis device of the camera 23 are interrupted in front). In this case, the notification ECU 10 calculates the curvature of the currently recognized driving lane L0 and extrapolates the part extended forward from the driving lane L0 based on the calculation result (extrapolation calculation). In addition, if the notification ECU 10 cannot recognize the driving lane L0 due to the absence of partition lines or guardrails, it may obtain the steering angle of the own vehicle from a steering sensor not shown and calculate (extrapolate) the driving lane L0 (the trajectory predicted to be passed by the own vehicle) based on the steering angle.

Next, the notification ECU 10 obtains (calculates) the positional relationship between the area SA above the driving lane L0 and the stop signal S based on the information (position) about the stop signal S obtained from the camera 23. In addition to the information obtained from the camera 23, the notification ECU 10 may also obtain (calculate) the position of the stop signal S based on the information obtained from the millimeter wave radar 21 and/or the sonar 22.

When the lit stop signal S is not present within area SA, but is present to the left and/or right of area SA, the notification ECU 10 acquires information about three-dimensional objects (structures) in the surroundings of the own vehicle from millimeter wave radar 21, sonar 22, and camera 23. If the notification ECU 10 detects the presence of a structure (e.g., wall, pillar) that forms structure BD between the stop signal S and the area SA based on this information, it determines that condition A is met. In this case, the lit stop signal S likely indicates that the passage through the gate adjacent to the gate the own vehicle is about to enter is prohibited. Therefore, if the notification ECU 10 determines that condition A is, met, it does not execute an attention-drawing process to alert the driver to the stop signal S.

Figure 2:
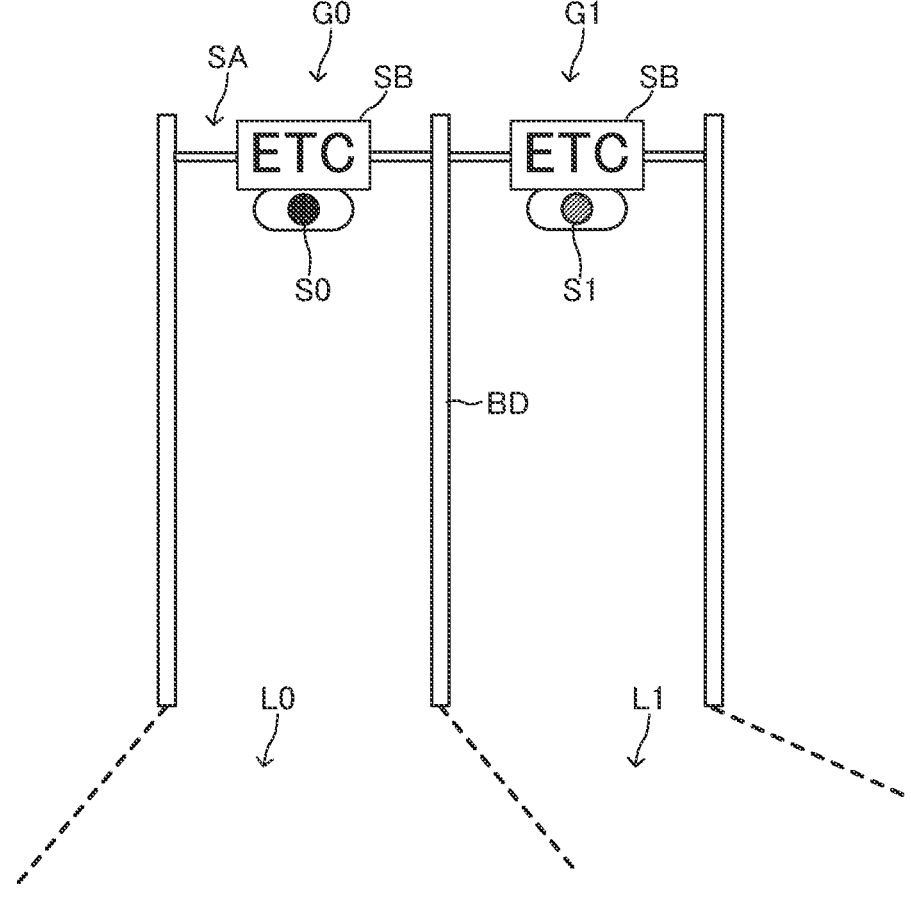
FIG. 2 is a schematic diagram showing a scene in which the own vehicle is passing through a gate (toll booth) of a toll road.

Next, with reference to FIG. 2, the operation of the notification device 1 when the own vehicle enters gate G0 on the expressway will be explained. In this example, the own vehicle is traveling in the lane L0 of a road consisting of two lanes, L0 and L1. Lane L0 is connected to gate G0, and lane L1 is connected to gate G1. The stop signal S0 at gate G0 is not lit, while the stop signal S1 at gate G1 is lit. The speed vs of the own vehicle is less than the threshold vsth.

Camera 23 recognizes that the stop signal S1 is lit and sends the position of stop signal S1 to the notification ECU 10. Since the stop signal S0 is not lit, the camera 23 does not send information about the stop signal S0 to the notification ECU 10. In addition, camera 23 obtains the positions (regions occupied by lanes L0 and L1 in the image) of lanes L0 and L1, and sends this information to the notification ECU 10. The notification ECU 10 recognizes the lane located approximately in the center of the horizontal field of view of the camera 23 as the lane in which the own vehicle is traveling (i.e., lane L0). Furthermore, based on the information obtained from the camera 23, the notification ECU 10 recognizes that stop signal S1 is not located above lane L0 in area SA, but is located to the right of area SA (above lane L1). Then, the notification ECU 10 obtains information about the structure in front of the own vehicle from the millimeter wave radar 21, sonar 22, and camera 23. Based on this information, the notification ECU 10 recognizes the presence of a structure (wall or pillar) of the building BD between the stop signal S1 and the area SA. Therefore, in this case, the notification ECU 10 determines that condition A is satisfied. In other words, the notification ECU 10 recognizes that "the stop signal S1 indicates that the passage through gate G1 adjacent to the gate G0 the own vehicle is about to enter is prohibited," and it does not execute an attention-drawing process to alert the driver to the stop signal S.

Figure 3:
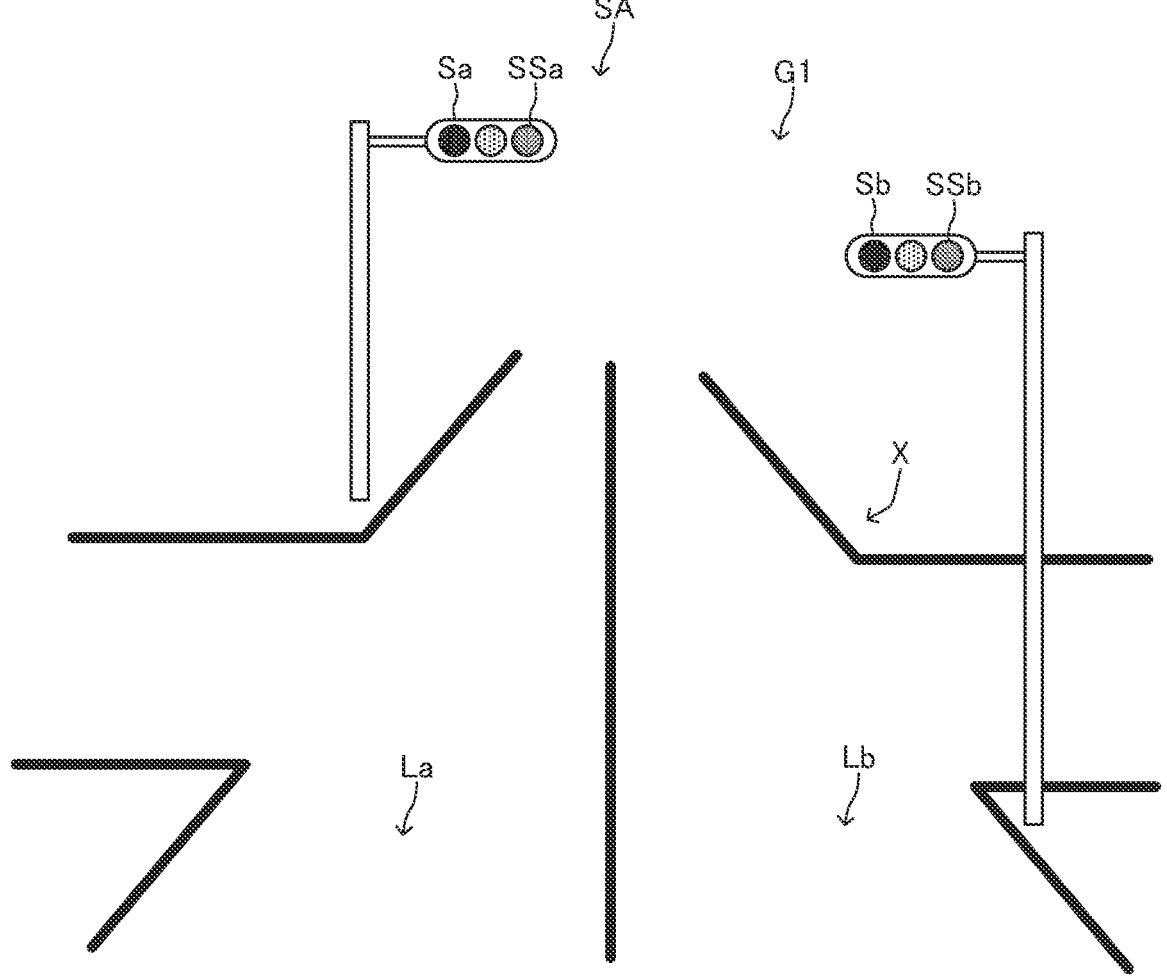
FIG. 3 is a schematic diagram showing a scene in which the own vehicle is passing through an intersection.

Next, with reference to FIG. 3, the operation of the notification device 1 when the own vehicle enters intersection X will be explained. In this example, the own vehicle is traveling in lane La of a road consisting of two lanes, La and Lb. At intersection X, there are two traffic signals Sa and Sb that indicate the passage of vehicles traveling in lane La. Traffic signal Sa is located within area SA above lane La, and traffic signal Sb is located to the right of area SA (above lane Lb). Traffic signal Sb is located closer to the own vehicle (in front) than traffic signal Sa. The red signals (stop signals SSa and SSb) of traffic signals Sa and Sb are lit. There is no structure (wall or pillar) of building BD between traffic signal Sb (stop signal SSb) and area SA above lane La.

Camera 23 recognizes that the stop signals SSa and SSb are lit and sends the positions of stop signals SSa and SSb to the notification ECU 10. In addition, camera 23 obtains the positions of lanes La and Lb, and sends this information to the notification ECU 10. Based on the information obtained from the camera 23, the notification ECU 10 recognizes that the own vehicle is traveling in lane La, that stop signal SSa is located within area SA, and that stop signal SSb is located to the right of area SA. In this case, condition A is not met. Therefore, the notification ECU 10 recognizes that "the stop signal SSb is not a t signal indicating that the passage through the gate adjacent to the gate the own vehicle is about to enter is prohibited," and executes an attention-drawing process to alert the driver to the stop signal S.

In this example, the stop signal SSb is positioned closer to the own vehicle than the stop signal SSa. Therefore, it is conceivable that the camera 23 may detect that the stop signal SSb is lit, and may not recognize that the stop signal SSa is also lit. In this case, based on the information acquired from camera 23, the notification ECU 10 recognizes that the stop signal SSb is located to the right of area SA. Then, the notification ECU 10 obtains information about the structure in front of the own vehicle from the millimeter wave radar 21, sonar 22, and camera 23. Based on this information, the notification ECU 10 recognizes that there is no structure (wall or pillar) of building BD between the stop signal SSb and area SA. Therefore, in this case, condition A is not satisfied. Hence, the notification ECU 10 recognizes that "the stop signal SSb does not indicate that the passage through the gate adjacent to the gate the own vehicle is about to enter is prohibited," and it executes an attention-drawing process to alert the driver to the stop signal S.

After executing the attention-drawing process, the notification ECU 10 erases the alert image on the display device when a certain termination condition is met. For example, the termination condition is met when the continuous duration T during which the camera 23 cannot obtain information about the stop signal S (i.e., the camera 23 does not recognize the stop signal S) exceeds a threshold Tth.

Next, referring to FIG. 4 and FIG. 5, a program PR1, PR2 executed by the CPU 10*a* (hereinafter simply referred to as the "CPU") of the notification ECU 10 to realize the above-mentioned warning function will be explained. In the program PR1, PR2, a flag F is used to indicate whether or not condition A is met. If condition A is met, the flag F is "1", and if condition A is not met, the flag F is "0".

Figure 4:
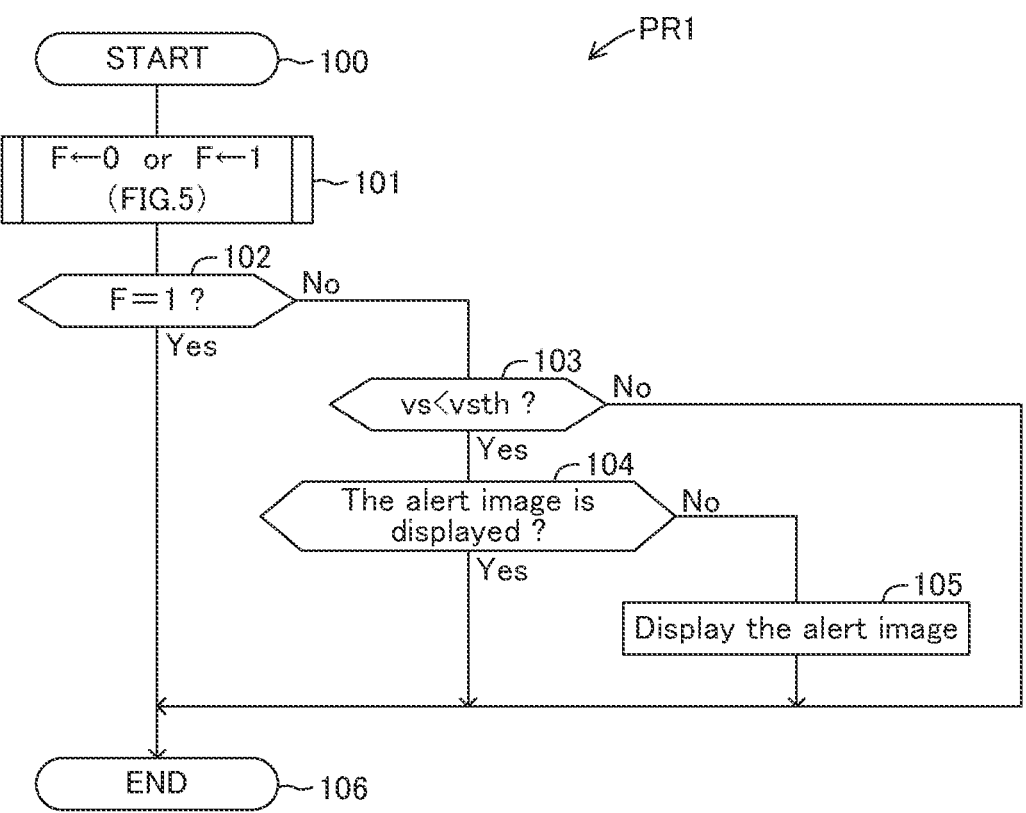
FIG. 4 is a flowchart of a program (main routine) for realizing the attention-drawing function.

The CPU executes the program PR1 shown in FIG. 4 at a certain cycle. The CPU starts executing the program PR1 from step 100 and proceeds to step 101.

Figure 5:
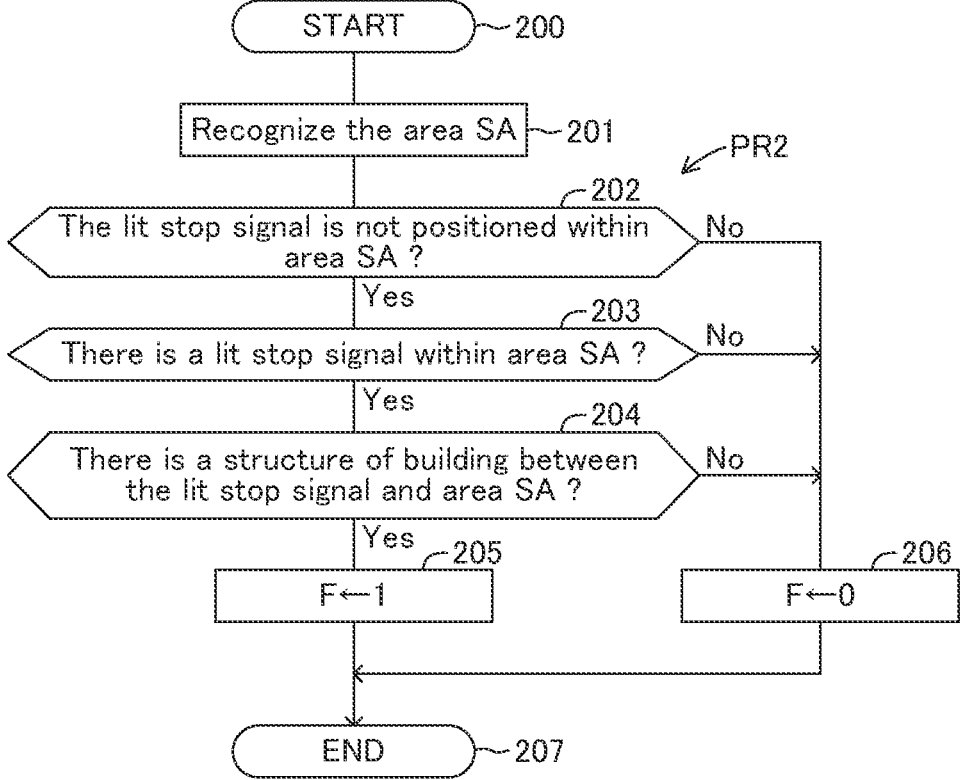
FIG. 5 is a flowchart of a program (subroutine) for setting flags according to the position of the detected lit stop signal and the presence or absence of the structure of a building.

When the CPU proceeds to step 101, it executes the program PR2 shown in FIG. 5 to determine the value of flag F. That is, the CPU determines whether or not condition A is met and assigns "1" or "0" to flag F accordingly.

The CPU starts executing the program PR2 from step 200 and proceeds to step 201.

When the CPU proceeds to step 201, it recognizes (distinguishes between area SA and other areas) area SA above the lane L0 on which the own vehicle is traveling, based on the information acquired from camera 23. Then, the CPU proceeds to step 202.

When the CPU proceeds to step 202, it determines whether it has detected that the lit stop signal S does not exist within area SA. If the CPU detects that the lit stop signal S does not exist within area SA (202: Yes), it proceeds to step 203. On the other hand, if the CPU does not detect that the lit stop signal S does not exist within area SA (202: No), it proceeds to step 206 described later.

When the CPU proceeds to step 203, it determines whether it has detected that the lit stop signal S exists to the left and/or right of area SA based on the information acquired from camera 23. If the CPU detects that the lit stop signal S exists to the left and/or right of area SA (203: Yes), it proceeds to step 204. On the other hand, if the CPU does not detect that the lit stop signal S exists to the left and/or right of area SA (203: No), it proceeds to step 205.

When the CPU proceeds to step 204, it determines whether there is a structure of building BD between the lit stop signal S and area SA, based on the information acquired from either or multiple devices among the millimeter wave radar 21, sonar 22, and camera 23. If the CPU determines that such structure exists (204: Yes), it proceeds to step 205. On the other hand, if the CPU determines that such structure does not exist (204: No), it proceeds to step 206.

When the CPU proceeds to step 205, it determines that condition A is met and assigns "1" to the flag F. Then, the CPU proceeds to step 207, finishes executing program PR2, and proceeds to step 102 of program PR1 (FIG. 4).

When the CPU proceeds to step 206, it determines that condition A is not met and assigns "0" to the flag F. Then, the CPU proceeds to step 207, finishes executing program PR2, and proceeds to step 102 of program PR1 (FIG. 4).

When the CPU proceeds to step 102, it determines whether the flag F is "1" or "0" (i.e., whether condition A is met or not). If the flag F is "1" (102: Yes), the CPU proceeds to step 106 and finishes executing program PR1. In other words, in this case, the CPU does not execute the attention-drawing process. In other words, the CPU skips the attention-drawing process (step 105 described later). If the flag F is "0" (102: No), the CPU proceeds to step 103.

When the CPU proceeds to step 103, it obtains the speed vs from the speed sensor 24, and determines whether the speed vs is less than a threshold vsth. If the speed vs is less than the threshold vsth (103: Yes), the CPU proceeds to step 104. If the speed vs is greater than or equal to the threshold vsth (103: No), the CPU proceeds to step 106.

When the CPU proceeds to step 104, it determines whether the information presentation device 30 is displaying the alert image. If the information presentation device 30 is displaying the alert image (104: Yes), the CPU proceeds to step 106 and finishes executing program PR1. If the information presentation device 30 is not displaying the alert image (104: No), the CPU proceeds to step 105.

When the CPU proceeds to step 105, it sends an alert start command to the information presentation device 30 to display the alert image. Then, the CPU proceeds to step 106 and finishes executing program PR1.

In addition, the CPU executes a non-illustrated program to erase the displayed alert image when the termination condition is satisfied while executing the above-mentioned program PR1 and PR2.

Effect

As described above, when condition A is met, there is a high possibility that the stop signal S is indicating that passing through the gate (toll booth of an expressway (toll road)) adjacent to the gate the own vehicle is about to enter is prohibited. The notification ECU 10 is configured to not execute the attention-drawing process when condition A is met. With the notification device 1 according to this embodiment, notification to alert the driver to a stop signal unrelated to the own vehicle's travel is suppressed.

The present disclosure is not limited to the above embodiment and can adopt various modifications within the scope of the invention.

Modification

For example, the image analysis device of camera 23 may be able to recognize a sign SB (for example, "ETC", "E-Z Pass" etc. indicating that it is a gate where the toll can be automatically collected) installed at the entrance or exit of an expressway (toll road). When camera 23 recognizes the sign SB, it sends the recognition result to the notification ECU 10. The notification ECU 10 does not execute the attention-drawing process when the following condition B is met.

<Condition B> There is a sign SB ahead of the own vehicle, and there is no lit stop signal S in the area SA above the predicted path (trajectory) of the own vehicle, and a lit stop signal S is present to the left and/or right of the area SA, and furthermore, there are structure of a building BD between the lit stop signal S and the area SA.

Figure 6:
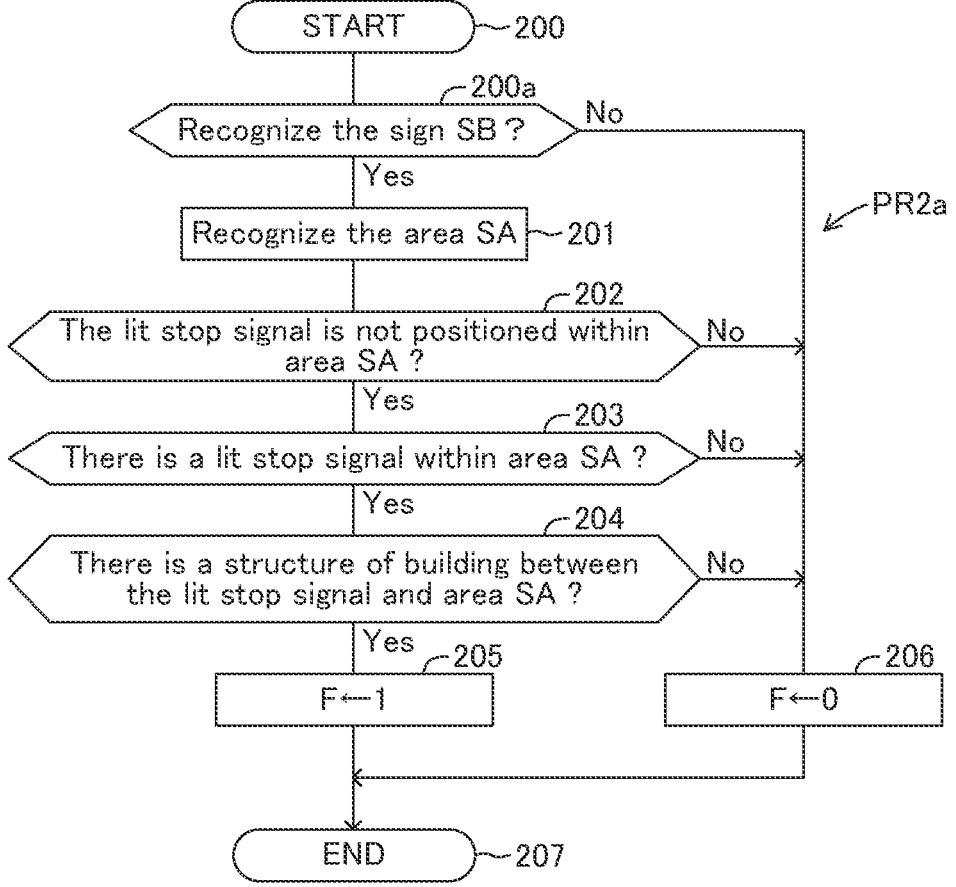
FIG. 6 is a flowchart of a program (subroutine) for setting flags according to the presence or absence of a certain sign, the position of the detected lit stop signal, and the presence or absence of the structure of a building, relating to a modification of the present disclosure.

In this case, the CPU executes the program PR2a shown in FIG. 6 instead of the program PR2. The CPU starts the execution of program PR2a from step 200 and proceeds to step 200a.

When the CPU proceeds to step 200a, it determines whether the sign SB has been detected. If the CPU has detected the sign SB (200a: Yes), it proceeds to step 201. On the other hand, if the CPU has not detected the sign SB (200a: No), it proceeds to step 205. The processing from step 201 onwards is the same as the processing from step 201 onwards in the program PR2 shown in FIG. 5.

In the notification device 1 according to this modified example, the notification ECU 10 determines whether it has detected the sign SB (for example, "ETC", "E-Z Pass", etc.). The CPU can accurately detect whether the own vehicle is located near the entrance or exit of an expressway (toll road) based on this determination result. The notification ECU 10 is configured not to perform an attention-drawing process when it detects that the own vehicle is located near an expressway (toll road), and the same condition as Condition A is met. According to the notification device 1 of the present embodiment, the driver's attention to stop signals unrelated to the own vehicle's driving is suppressed.

What is claimed is:

1. A system comprising:
an own vehicle having:
   a camera configured to capture a plurality of images to obtain information about objects existing around the own vehicle;
   a speed sensor configured to obtain a speed of the own vehicle;
   an electronic control unit configured to analyze the plurality of images to identify a position of a traffic signal; and
   a display device configured to present information to a driver of the own vehicle,
wherein the electronic control unit is further configured to:
   execute an attention-drawing process to generate an alert to draw the driver's attention to the traffic signal positioned in front of the own vehicle, by presenting predetermined information to the display device when the electronic control unit detects, based on the information obtained from the camera, that a red signal of the traffic signal is lit,
   obtain the speed of the own vehicle from the speed sensor and determine whether the speed is less than a threshold in which the threshold is a maximum speed at which the driver can stop the own vehicle before the stop signal by stepping on a brake pedal when the alert is generated, the threshold is set based on a driver operations mode to assist the driver such that the threshold changes based on the determined driver operations mode, and based on a distance between the traffic signal and the own vehicle, when the speed is less than the threshold, the electronic control unit controls the display device to display the alert, and
   not to execute the attention-drawing process to generate the alert when the condition is met for recognizing that the red signal of a traffic signal of an adjacent gate to the gate predicted to be passed by the own vehicle is lit.

2. The system according to claim 1, wherein
the electronic control unit is configured to determine that the condition has been met when it detects that there is no lit red signal within a predetermined area above the trajectory predicted to be passed by the own vehicle, and there is a lit red signal to the left and/or right of the predetermined area, and furthermore, there is a structure of a building between the lit red signal and the predetermined area.

3. The system according to claim 1, wherein
the electronic control unit is configured to determine that the condition has been met when it detects a sign indicating an automatic toll collection gate of a toll road, and that there is no lit red signal within a predetermined area above the trajectory predicted to be passed by the own vehicle, and there is a lit red signal to the left and/or right of the predetermined area, and furthermore, there is a structure of a building between the lit red signal and the predetermined area.

4. A notification method comprising:
an information acquisition step for obtaining, via a camera configured to capture a plurality of images to obtain information about objects existing around an own vehicle, the information about objects existing around the own vehicle;
obtaining, via a speed sensor configured to obtain a speed of the own vehicle, the speed of the own vehicle;
analyzing, via an electronic control unit, the plurality of images to identify a position of a traffic signal; and
an attention-drawing step for generating, via the electronic control unit, predetermined information for display on a display device mounted on the own vehicle to draw a driver's attention to the traffic signal positioned in front of the own vehicle when it is detected, based on the information obtained from the camera, that the red signal of the traffic signal is lit, and the speed is less than the threshold in which the threshold is a maximum speed at which the driver can stop the own vehicle before the stop signal by stepping on a brake pedal when the predetermined information is presented, the threshold is set based on a driver operations mode to assist the driver such that the threshold changes based on the determined driver operations mode, and based on a distance between the traffic signal and the own vehicle,
when the speed is less than the threshold, controlling, via the electronic control unit, the display device to display the predetermined information, and
skipping the attention-drawing step when the condition is met for recognizing, via the electronic control unit, that the red signal of a traffic signal of an adjacent gate to the gate predicted to be passed by the own vehicle is lit.

5. A non-transitory storage medium storing a notification program for causing a computer equipped in the own vehicle to execute:
an information acquisition step for obtaining, via a camera configured to capture a plurality of images to obtain information about objects existing around an own vehicle, the information about objects existing around the own vehicle;

obtaining, via a speed sensor configured to obtain a speed of the own vehicle, the speed of the own vehicle;

analyzing, via the computer, the plurality of images to identify a position of a traffic signal; and an attention-drawing step for generating, via the computer, predetermined information for display on a display device mounted on the own vehicle to draw a driver's attention to the traffic signal positioned in front of the own vehicle when it is detected, based on the information obtained from the camera, that the red signal of the traffic signal is lit, and the speed is less than the threshold in which the threshold is a maximum speed at which the driver can stop the own vehicle before the stop signal by stepping on a brake pedal when the predetermined information is presented, the threshold is set based on a driver operations mode to assist the driver such that the threshold changes based on the determined driver operations mode, and based on a distance between the traffic signal and the own vehicle, when the speed is less than the threshold, controlling, via the computer, the display device to display the predetermined information, and skipping the attention-drawing step when the condition is met for recognizing, via the computer, that the red signal of a traffic signal of an adjacent gate to the gate predicted to be passed by the own vehicle is lit.

\* \* \* \* \*